(12) United States Patent
Hall

(10) Patent No.: US 11,434,054 B2
(45) Date of Patent: Sep. 6, 2022

(54) FLUID SAMPLING VESSEL AND SYSTEM

(71) Applicant: Checkfluid Inc., London (CA)

(72) Inventor: Bernard Hall, London (CA)

(73) Assignee: Checkfluid Inc., London (CA)

( * ) Notice: Subject to any disclaimer, the term of this patent is extended or adjusted under 35 U.S.C. 154(b) by 255 days.

(21) Appl. No.: 17/003,013

(22) Filed: Aug. 26, 2020

(65) Prior Publication Data

US 2021/0063286 A1 Mar. 4, 2021

Related U.S. Application Data

(60) Provisional application No. 62/892,071, filed on Aug. 27, 2019.

(51) Int. Cl.
*B65D 49/08* (2006.01)
*G01N 1/14* (2006.01)

(52) U.S. Cl.
CPC .............. *B65D 49/08* (2013.01); *G01N 1/14* (2013.01); *G01N 2001/1418* (2013.01)

(58) Field of Classification Search
CPC .... G01N 1/10; G01N 1/14; G01N 2001/1418; G01N 2001/2071; G01N 2001/2078; B65D 49/08
See application file for complete search history.

(56) References Cited

U.S. PATENT DOCUMENTS

| | | |
|---|---|---|
| 3,357,601 A | 12/1967 | Crawford et al. |
| 3,833,000 A | 9/1974 | Bridgman |
| 5,146,792 A | 9/1992 | Iff |
| 6,112,759 A | 9/2000 | Hsu |
| 8,973,448 B2 | 3/2015 | Adriani |
| 2010/0304944 A1* | 12/2010 | Monzel ................ B65B 7/2835 493/114 |

FOREIGN PATENT DOCUMENTS

| | | | | |
|---|---|---|---|---|
| GB | 2566578 A | * | 3/2019 | ............. B65D 11/08 |
| WO | WO-2018178685 A1 | * | 10/2018 | ............. B65D 83/38 |

* cited by examiner

*Primary Examiner* — Benjamin R Schmitt
(74) *Attorney, Agent, or Firm* — Brunet & Co. Ltd.; Robert Brunet; Hans Koenig

(57) ABSTRACT

A fluid sampling system and fluid sampling vessel therefor permit sampling of fluids from industrial machines or fluid storage containers using one hand while being able to retain sampled fluids without spillage and without permitting contaminants to enter the sampling bottle before, during and/or after sampling.

15 Claims, 5 Drawing Sheets

FLUID SAMPLING VESSEL AND SYSTEM

CROSS-REFERENCE TO RELATED APPLICATIONS

This application claims the benefit of U.S. Provisional application 62/892,071 filed Aug. 27, 2019.

FIELD

This application relates to fluid sampling systems and to fluid sampling vessels for use in the fluid sampling systems.

BACKGROUND

The sampling of working fluids of industrial machines or fluids stored in fluid storage containers is often required for preventative maintenance and/or quality control. Prior art methods employed to obtain a representative, pressurized or non-pressurized fluid sample typically require removal of a lid from a bottle and an independent activation of a valve on the bottle to send fluid from the fluid source into the bottle. In such prior art methods, air in the bottle is displaced by the fluid and vented to atmosphere. Removal of a typical lid, with or without a vent port, is not be able to contain gases, gas entrained fluids or hygroscopic fluids for analysis. Removal and temporary placement of the lid also allows the ingress of airborne contamination and moisture which can distort counts of particulate, wear metals, gases or moisture when sampling in any non-highly controlled environment.

Thus, available sampling devices generally suffer from being cumbersome to use and/or prone to allowing contaminants into the sampling device or allowing sampled fluids to escape out of the sampling device.

There remains a need for a sampling system that is both easy to use and can preserve the integrity of the sampled fluid.

SUMMARY

In one aspect, there is provided a fluid sampling vessel comprising: a bottle having a mouth; a cap for the bottle, the cap comprising a rim sealingly engageable with the mouth of the bottle, a sampling port through a top of the cap fluidly connecting an interior volume of the bottle with an external environment, an open-ended conduit extending from the sampling port at an underside of the cap into the bottle when the cap is engaged with the bottle so that fluid entering the sampling port from the external environment can flow from a first end of the conduit to a second end of the conduit into the bottle, the conduit comprising a guide portion proximate the first end and a valve retaining portion proximate the second end and longitudinally aligned with the guide portion, the guide portion separated from the valve retaining portion by a valve seat; a spring-loaded ball valve situated in the valve retaining portion, the spring-loaded ball valve comprising a ball and a spring, the ball seated on the spring and biased by the spring toward the valve seat, the ball preventing fluid from flowing between the guide portion and the valve retaining portion when the ball is seated on the valve seat and permitting fluid to flow between the guide portion and the valve retaining portion when the ball is pushed away from the valve seat against the bias of the spring; and a removable retainer mounted proximate the second end of the conduit, the retainer preventing the spring and the ball from exiting the conduit through the second end while permitting fluid to flow out of the conduit into the bottle.

In another aspect, there is provided a fluid sampling system comprising: the fluid sampling vessel as defined above; and, an adapter releasably connectable to the sampling port of the cap of the vessel and to a fluid outlet of a source of the fluid, the adapter comprising a fluid flow channel in fluid communication with the open-ended conduit of the vessel and the source of the fluid when the adapter is connected to both the sampling port and the fluid outlet, and an activating probe for opening the spring-loaded ball valve when the adapter is connected to the sampling port.

In an embodiment, the rim is sealingly engageable with the mouth of the bottle by a sealing element. In an embodiment, the cap comprises a perimetrical groove around an inner circumference at an underside of the cap for retaining the sealing element in the cap.

In an embodiment, the removable retainer comprises a tension clip washer having a perimetrical raised edge mated with an internal clip groove in the valve retaining portion of the open-ended conduit. In an embodiment, the removable retainer comprises at least one aperture therein to permit fluid flow between the interior volume of the bottle and the valve retaining portion of the open-ended conduit. In an embodiment, the valve retaining portion of the open-ended conduit comprises at least one slot, preferably opposed slots, in a wall thereof to facilitate insertion and removal of the tension clip washer from the open-ended conduit.

In an embodiment, the fluid sampling vessel further comprises an analysis sensor located in the interior volume of the bottle for collecting physical and/or chemical property data on the fluid in the bottle. In an embodiment, the analysis sensor wirelessly transmits the data collected to a receiving device outside the fluid sampling vessel.

In an embodiment, the activating probe comprises an engagement surface that engages the ball of the spring-loaded ball valve to displace the ball against the bias of the spring to open the spring-loaded ball valve when the activating probe is connected to the sampling port of the cap of the vessel.

In an embodiment, the system further comprises an actuatable sampling valve connectable to the adapter and the fluid outlet between the adapter and the fluid outlet. In an embodiment, the actuatable sampling valve is openable to permit fluid flow from the fluid outlet to the adapter and closeable to prevent fluid flow from the fluid outlet to the adapter.

In an embodiment, the system further comprises a vacuum line connector releasably connectable to the sampling port of the cap of the vessel and to a vacuum line. In an embodiment, the vacuum line connector comprises a fluid flow pipe in fluid communication with the open-ended conduit of the vessel and the vacuum line when the vacuum line connector is connected to both the sampling port and the vacuum line. In one embodiment, the vacuum line connector comprises a valve opener for opening the spring-loaded ball valve when the vacuum line connector is connected to the sampling port. In one embodiment, the valve opener comprises an engagement surface that engages the ball of the spring-loaded ball valve to displace the ball against the bias of the spring to open the spring-loaded ball valve when the vacuum line connector is connected to the sampling port of the cap of the vessel.

The fluid sampling vessel is ventless in that the vessel does not require a separate vent to permit displacement of air inside the vessel during sampling of the fluid in order to avoid over-pressurization in the vessel. Instead, the vessel may be at least partially evacuated through a vacuum line connector connected at the sampling port to provide a low pressure inside the vessel, which is at a lower pressure than the fluid being sampled from a higher-pressure fluid source. The spring-loaded ball valve seals the interior volume of the fluid sampling vessel until the fluid is sampled using the sampling system. Use of the vessel in conjunction with the adapter having an activating probe to displace the ball of the ball valve unseals the interior volume of the fluid sampling vessel to permit the fluid to flow from the fluid source at higher pressure into a lower pressure interior volume of the vessel until the pressures equalize or until enough fluid has been collected. At that time, the activating probe may be operated to re-seal the interior volume of the fluid sampling vessel to prevent contamination of the fluid collected in the vessel.

The activating probe of the adapter and valve opener of the vacuum line connector may utilize the same or a similar type of element to open the ball valve. The activating probe and/or the valve opener may comprise an engagement surface that engages the ball to displace the ball against the bias of the spring.

With the valve opener, when the vacuum line connector is connected to the sampling port of the cap of the vessel, the valve opener automatically opens the ball valve. Insertion of the vacuum line connector into the sampling port causes the engagement surface of the valve opener to engage with the ball to displace the ball against the bias of the spring to open the ball valve. Air in the interior volume of the fluid sampling vessel can then be evacuated through a vacuum line connected to the vacuum line connector and a vacuum pump. Removing the vacuum line connector from the sampling port permits the ball valve to re-seal the interior volume of the fluid sampling vessel to retain the interior volume under a lower pressure.

With the activating probe, when the adapter is connected to the sampling port of the cap of the vessel, the activating probe automatically opens the ball valve. Insertion of the adapter into the sampling port causes the engagement surface of the activating probe to engage with the ball to displace the ball against the bias of the spring to open the ball valve. With the adapter connected to the source of fluid, the fluid from the source can then flow through the fluid flow channel in the adapter into the fluid sampling vessel. Removing the adapter from the sampling port permits the ball valve to re-seal the interior volume of the fluid sampling vessel to retain the sampled fluid captured therein.

The fluid sampling system is easy to use with only one hand, thereby making the system safer to use in locations where a free hand may be required to ensure an operator's safety, for example on a ladder or at a top of a water tower. At the same time, the fluid sampling system is able to retain sampled fluids without or with minimal spillage and without permitting contaminants to enter the sampling bottle before, during and/or after sampling.

The fluid may be a gas, a liquid or a mixture of gas and liquid. The fluids may be sampled from industrial machines or fluid storage containers. Fluid samples comprising a liquid are most common in the field of industrial machines. Preferably, the fluid comprises a liquid or gas found in lubricated power transmission apparatuses. Some fluids that may be sampled include, for example, motor oil from an engine casing, transmission oil from a transmission manifold, brake fluid from a braking system, hydraulic fluid from a hydraulic pump or motor, and the like.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

Figure 1:
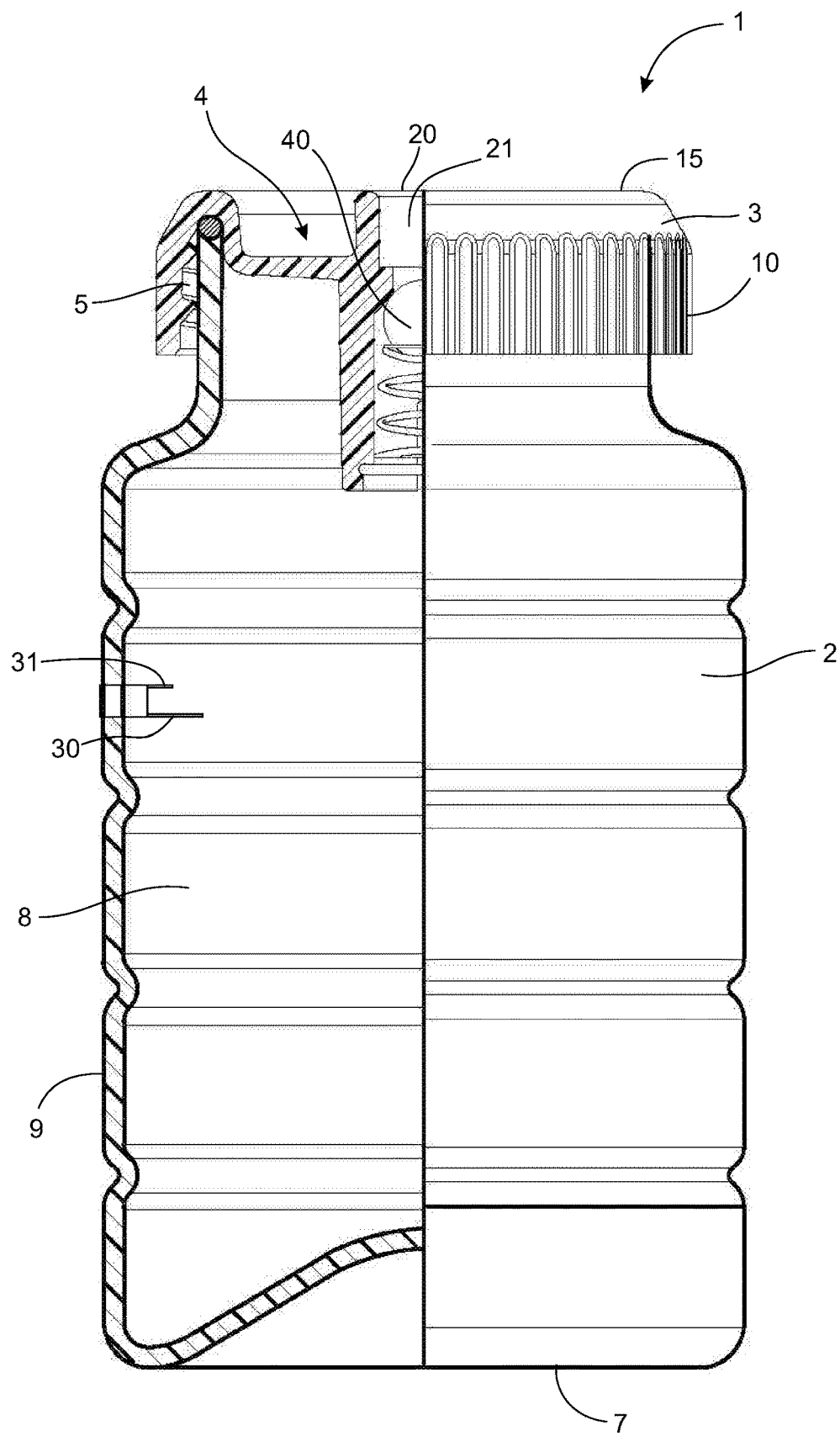
FIG. 1 depicts a side view of a fluid sampling vessel cut away on a left side to show an interior of a bottle of the vessel.
Figure 2:
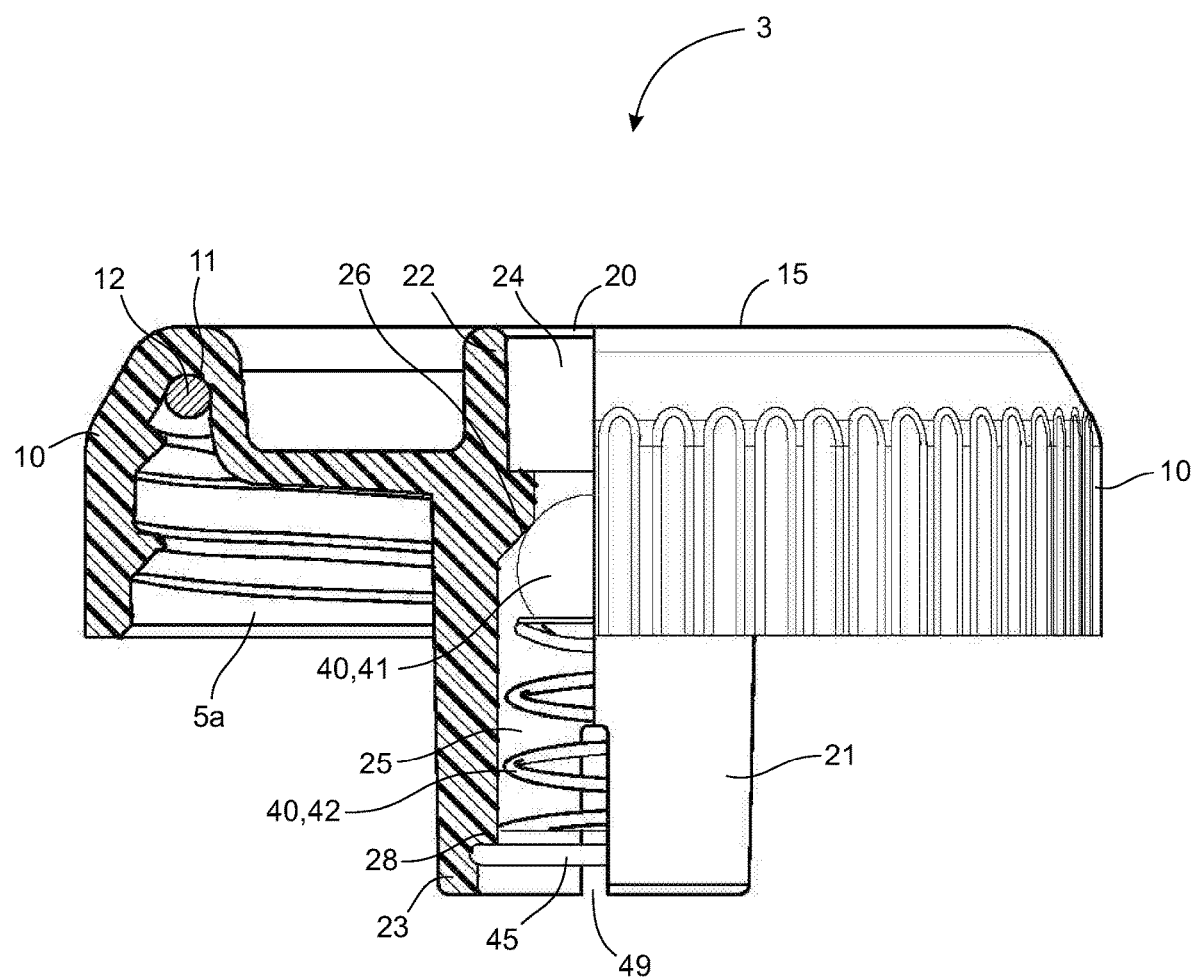
FIG. 2 depicts a magnified view of a cap on the vessel in FIG. 1.
Figure 3:
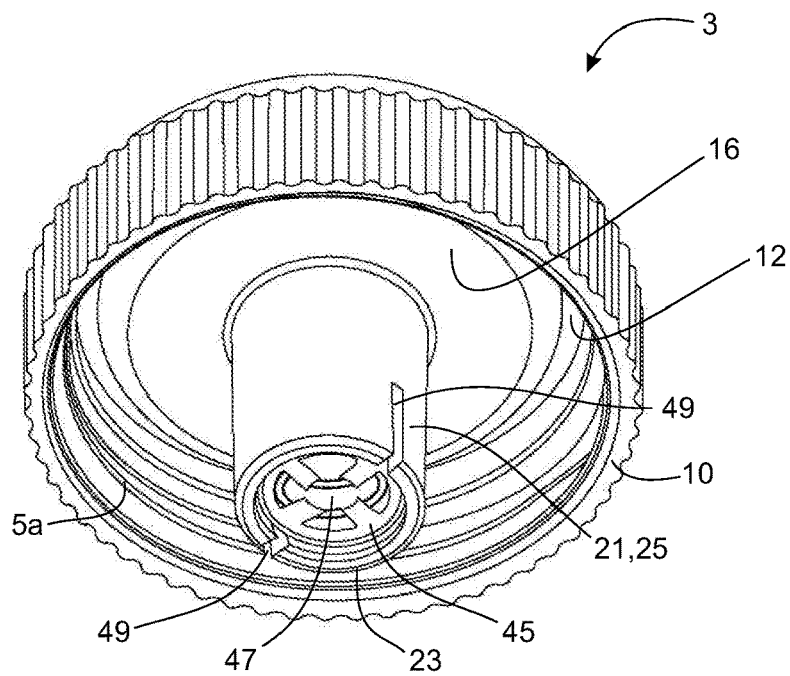
FIG. 3 depicts a bottom perspective view of the cap of FIG. 2.
Figure 4:
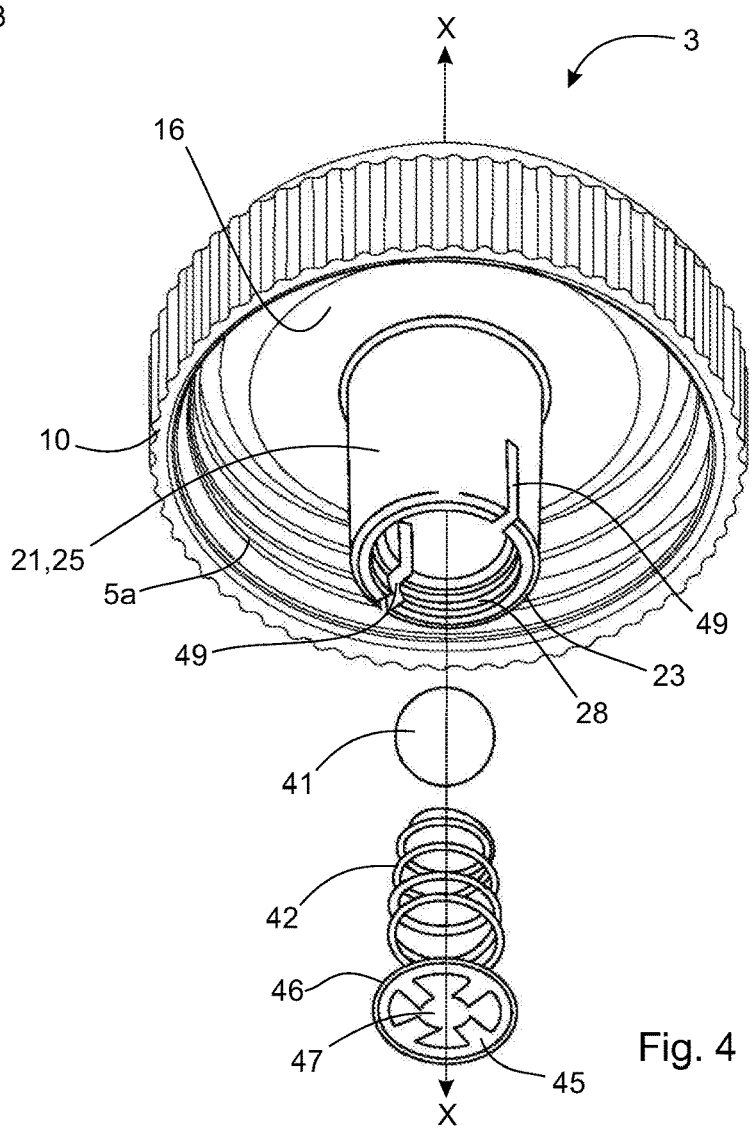
FIG. 4 depicts an exploded view of the cap of FIG. 3.

With reference to FIG. 1, FIG. 2, FIG. 3 and FIG. 4 an embodiment of a ventless fluid sampling vessel 1 is shown with a cut away on a left side of the vessel 1 in FIG. 1 to partially show an interior volume 8 of a bottle 2 and an interior of a cap 3 of the fluid sampling vessel 1. The bottle 2 comprises a closed bottom 7 and a perimetrical wall 9 extending upward from the closed bottom 7 terminating in an open mouth 4. The cap 3 comprises an annular top 15 and a perimetrical rim 10 extending downward from the annular top 15. The cap 3 completely covers the mouth 4 when the cap 3 is used to close the bottle 2. The bottle 2 and the cap 3 comprise mated screw threads 5 for securing the cap 3 to the bottle 2. The cap 3 can be removed from the bottle 2 by unscrewing the cap 3 thereby opening the bottle 2. The bottle 2 comprises external screw threads while the cap 3 comprises internal screw threads 5a.

The rim 10 of the cap 3 is sealingly engageable with the mouth 4 of the bottle 2. To provide a fluid-tight seal against both liquids and gases, the cap 3 comprises a perimetrical groove 11 above the screw threads 5a around an inner circumference at an underside 16 of the cap 3 for retaining a perimetrical sealing element 12 in the cap 3, which forms the fluid-tight seal between the cap 3 and the wall 9 of the bottle 2 at the mouth 4. The sealing element 12 assists with preventing fluids from escaping the bottle 2, assists with preventing contaminants from entering the bottle 2, and assists with maintaining a vacuum in the bottle 2 for extended periods of time. The sealing element 12 may be, for example, an o-ring or a gasket or any other suitable seal. The sealing element 12 is preferably elastomeric.

The cap 3 comprises a sampling port 20 through the top 15 of the cap 3 fluidly connecting the interior volume 8 of the bottle 2 with an external environment. An open-ended cylindrical conduit 21 extends from the sampling port 20 at the underside 16 of the cap 3 into the bottle 2 when the cap 3 is engaged with the bottle 2 so that fluid entering the sampling port 20 from the external environment can flow from a first end 22 of the conduit 21 to a second end 23 of the conduit 21 into the bottle 2. The open-ended cylindrical conduit 21 comprises a guide portion 24 proximate the first end 22 and a valve retaining portion 25 proximate the second end 23 and longitudinally aligned with the guide portion 24 along a central axis X-X of the cap 3, the guide portion 24 separated from the valve retaining portion 25 by a valve seat 26. The valve seat 26 comprises a portion of the conduit 21, which narrows from the valve retaining portion 25 to the guide portion 24.

A spring-loaded ball valve 40 is situated in the valve retaining portion 25. The spring-loaded ball valve 40 comprises a ball 41 and a spring 42, the ball 41 seated on the spring 42 and biased by the spring 42 toward the valve seat 26. The ball 41 prevents fluid from flowing between the guide portion 24 and the valve retaining portion 25 when the ball 41 is seated on the valve seat 26, and permits fluid to flow between the guide portion 24 and the valve retaining portion 25 when the ball 41 is pushed away from the valve seat 26 against the bias of the spring 42. The spring 42 as illustrated comprises a helical compression spring, however, other springs may be employed instead, for example leaf springs, torsion springs, spring washers and the like.

A removable tension clip washer 45 is mounted proximate the second end 23 of the conduit 21, the tension clip washer 45 having the spring 42 seated thereon and preventing the spring 42 and the ball 41 from exiting the conduit 21 through the second end 23 while permitting fluid to flow out of the conduit 21 into the bottle 2. The removable tension clip washer 45 comprises a perimetrical raised edge 46 mated with an internal clip groove 28 in the valve retaining portion 25 proximate the second end 23 of the conduit 21. The tension clip washer 45 can be snapped into the internal clip groove 28 and is retained in the internal clip groove 28 with sufficient force that the spring 42 and the ball 41 are retained in the valve retaining portion 25 under normal operation of the fluid sampling vessel 1. The removable tension clip washer 45 comprises an aperture 47 to permit fluid flow between the interior volume 8 of the bottle 2 and the valve retaining portion 25 of the conduit 21. Further, opposed slots 49 in the wall of the conduit 21 facilitate insertion and removal of the tension clip washer 45 when assembly and disassembly of the fluid sampling vessel 1 is required, for example during servicing of the fluid sampling vessel 1. While the removable tension clip washer 45 is illustrated, other forms of removable retainer may be utilized to retain the spring-loaded ball valve in the valve retaining portion.

The fluid may be sampled in order to analyze physical and/or chemical properties of the fluid. Analysis of the fluid may be accomplished by external analyzers, in which case the fluid sampling vessel 1 with the sampled fluid therein is sent for analysis without removing the cap 3. However, in an embodiment, the fluid sampling vessel 1 may be equipped with a dedicated analysis sensor 30, for example located in the interior volume 8 of the bottle 2, in order to collect physical and/or chemical property data on the fluid in the fluid sampling vessel 1 without the need to transfer the fluid out of the fluid sampling vessel 1. The sensor 30 is inserted through an aperture in a wall 9 of the bottle 2, the aperture sealed around the sensor 30 to prevent fluids from escaping the fluid sampling vessel 1 and to prevent air and external contaminants from entering the fluid sampling vessel 1. The dedicated analysis sensor 30 may be equipped with a power source (e.g. a battery), and an antenna 31 for wirelessly transmitting the data collected by the sensor 30 to a receiving device outside the fluid sampling vessel, for example a computer, having non-transient electronic memory for storing the data and/or being programmed for appropriate data analysis. Power and/or data signal communication may alternatively be accomplished through external wired connections to the sensor 30. The use of the dedicated analysis sensor 30 reduces the possibility of contaminating the fluid during transfer of the fluid to an external analyzer, and provides faster results.

Figure 5:
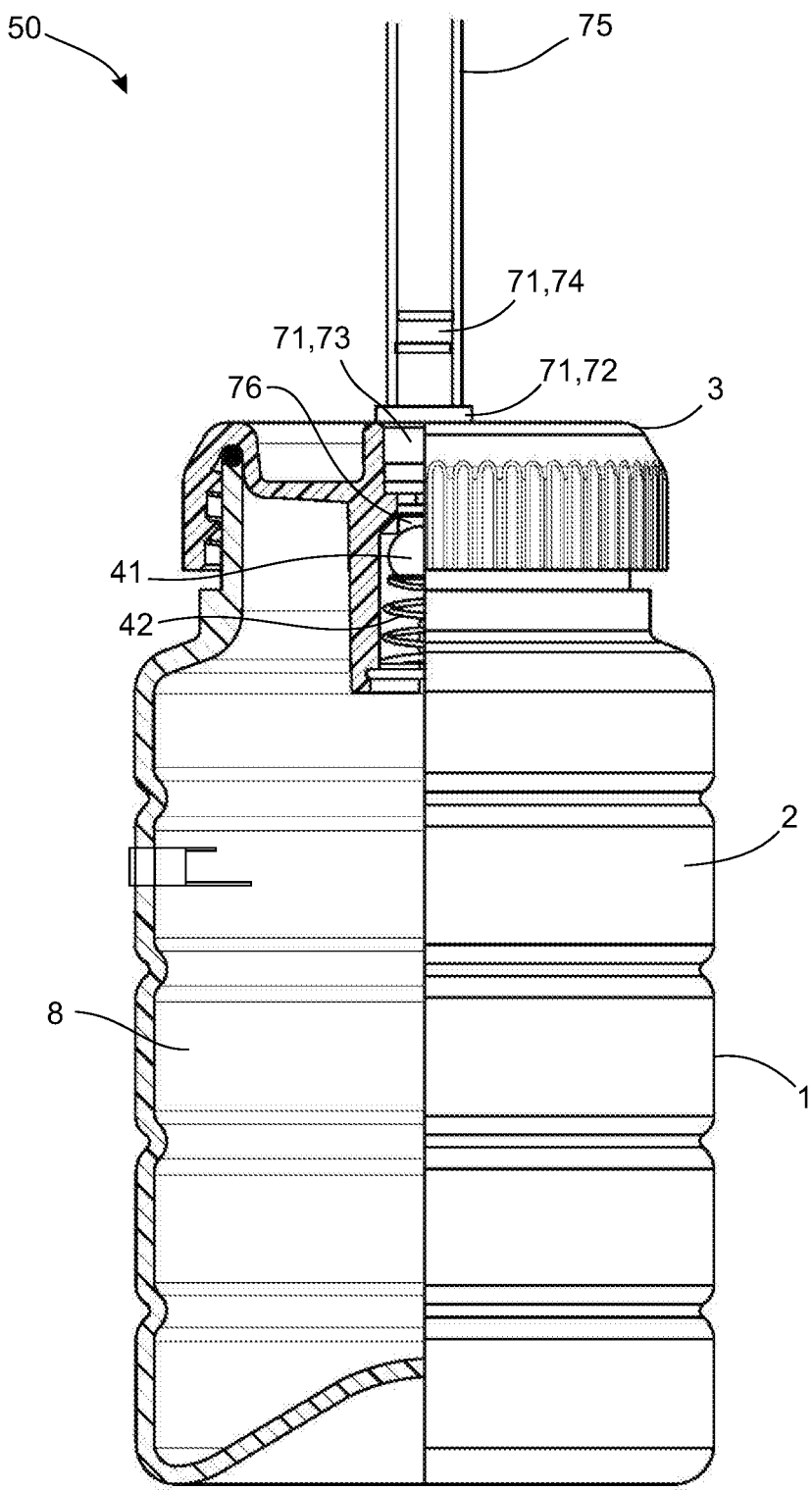
FIG. 5 depicts the fluid sampling vessel of FIG. 1 in association with a vacuum line to permit preliminary evacuation of the vessel; and, FIG. 6 depicts a fluid sampling system comprising the fluid sampling vessel of FIG. 1, an adapter connected to the vessel and a sampling valve connected to the adapter.
Figure 6:
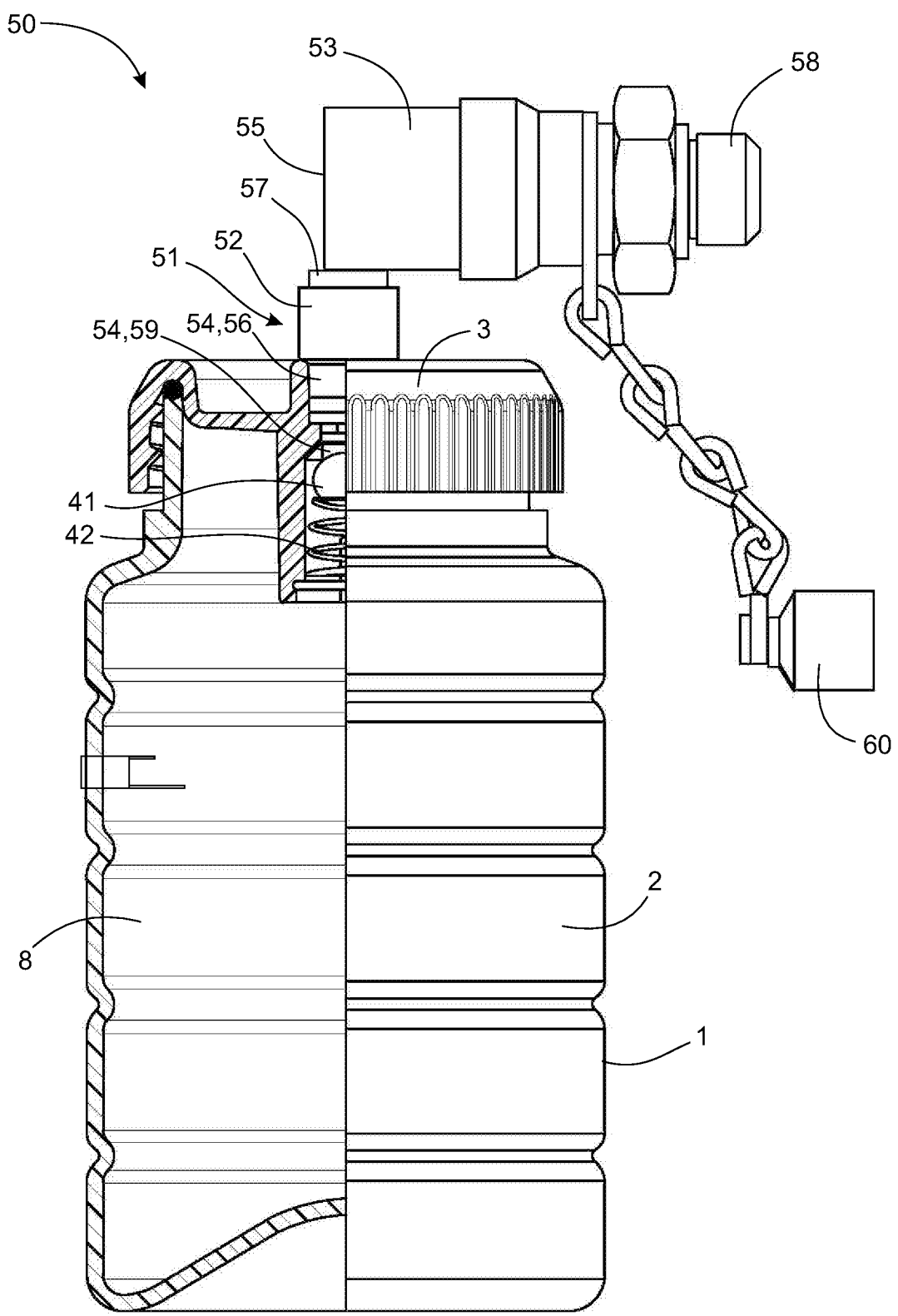

With further reference to FIG. 5 and FIG. 6, to sample fluid, the fluid sampling vessel 1 is used in a fluid sampling system 50, where the fluid sampling system 50 comprises the fluid sampling vessel 1, an adapter 51 for connecting the sampling vessel 1 to a source of the fluid, and a vacuum line connector 71 for connecting the fluid sampling vessel 1 to a vacuum line for evacuating air from the fluid sampling vessel 1 using a vacuum pump.

With particular reference to FIG. 5, in preparation for sampling, the fluid sampling vessel 1 is first evacuated to provide a lower pressure in the interior volume 8 of the bottle 2 than in the fluid to be sampled. To evacuate the fluid sampling vessel 1, the vacuum line connector 71 is used. The vacuum line connector 71 comprises a conduit nozzle 73 for insertion through the sampling port 20 into the guide portion 24 of the conduit 21, a vacuum line nozzle 74 to which a vacuum line 75 can be connected by a friction fit, and a stopping ring 72 between the conduit nozzle 73 and the vacuum line nozzle 74 for arresting the insertion of the conduit nozzle 73 in the sampling port 20 and for assisting in sealing the connection between the vacuum line connector 71 and the sampling port 20. While the guide portion 24 of the conduit 21 and the conduit nozzle 73 are shown with smooth walls that form a friction fit, the guide portion and the conduit nozzle may instead be matingly threaded, or partially threaded, to provide a threaded fitting of the conduit nozzle in the guide portion. The conduit nozzle 73 comprises a ball engagement surface 76 at a distal end thereof. The conduit nozzle 73 and vacuum line nozzle 74 together provide a fluid flow pipe between the conduit 21 and the vacuum line 75. The vacuum line 75 is connectable to a vacuum pump (not shown) at a far end of the vacuum line 75. The conduit nozzle 73 is sufficiently long that when the conduit nozzle 73 is inserted through the sampling port 20, the guide portion 24 guides the conduit nozzle 73 to a fullest extent down to the ball 41 of the ball valve 40 where the ball engagement surface 76 of the conduit nozzle 73 engages the ball 41 displacing the ball 41 against the bias of the spring 42 to unseat the ball 41 from the valve seat 26 to automatically open the valve 40. Operation of the vacuum pump then evacuates air from the interior volume 8 of the bottle 2. Once evacuation is complete, removal of the conduit nozzle 73 from the guide portion 24 and the sampling port 20 disengages the ball engagement surface 76 from the ball 41 thereby permitting the spring 42 to urge the ball 41 back on to the valve seat 26 thereby once again sealing the conduit 21 thus retaining a lower pressure in the interior volume 8 of the bottle 2 in comparison to the air pressure in the environment outside the fluid sampling vessel 1. The evacuated fluid sampling vessel 1 is then used to sample a fluid from a fluid source as described below.

With particular reference to FIG. 6, a fluid sampling system 50 comprises the fluid sampling vessel 1, an adapter 51 connected to the vessel 1 and a sampling valve 53 connected to the adapter 51. The adapter 51 comprises an adapter body 52 and an activating probe 54, the adapter 51 having a fluid flow channel (not shown) therein extending through both the adapter body 52 and the activating probe 54. The fluid flow channel permits fluid to flow through the adapter 51 from the fluid source to the fluid sampling vessel 1. The activating probe 54 comprises a boss 56 for insertion into the sampling port 20 of the fluid sampling vessel 1, the boss 56 guided toward the ball 41 by the guide portion 24 of the conduit 21. The boss 56 forms part of the fluid flow channel in the adapter 51. An engagement surface 59 of the boss 56 engages the ball 41 displacing the ball 41 against the bias of the spring 42 to unseat the ball 41 from the valve seat 26 to open the spring-loaded ball valve 40 when the boss 56 is fully inserted through the sampling port 20 into the guide portion 24 of the conduit 21. When the boss 56 is fully inserted, the adapter body 52 forms a seal with an upper surface of the cap 3 around the sampling port 20 to help prevent fluid leakage at the sampling port 20. Further, the boss 56 has a diameter such that the boss 56 forms a friction fit with the guide portion 24 of the conduit 21 to further help seal the sampling port 20. While the guide portion 24 of the conduit 21 and the boss 56 are shown with smooth walls that form a friction fit, the guide portion and the boss may instead be matingly threaded, or partially threaded, to provide a threaded fitting of the boss in the guide portion.

The fluid sampling system 50 further comprises the sampling valve 53 releasably connectable to the adapter 51 and to a fluid outlet on the fluid source. The sampling valve 53 comprises an adapter fitting 57 that can be releasable connected to the adapter body 52, for example with mated screw threads. The sampling valve 53 further comprises a fluid outlet fitting 58 adapted to engage with the fluid outlet on the fluid source. The sampling valve 53 comprises a fluid flow channel therein (not shown) in fluid communication with the fluid flow channel in the adapter 51 and the fluid outlet of the fluid source when the adapter 51, the sampling valve 53 and the fluid outlet are all connected to together. The sampling valve 53 is openable and closeable to permit or prevent fluid flow between the fluid outlet on the fluid source and the adapter 51. Opening of the sampling valve 53 is accomplished by pressing on a pressing surface 55 of the sampling valve 53. Releasing pressure on the pressing surface 55 causes the sampling valve 53 to close. A suitable sampling valve is a KP pushbutton sampling valve from Checkfluid™ Inc. A cover 60 is used to cover the adapter fitting 57 when the adapter fitting 57 is not in use.

To sample the fluid from the fluid source, the sampling valve 53 is fitted to the fluid outlet of the fluid source via the fluid outlet fitting 58. Then, the adapter 51 is fitted on to the sampling valve 53. The sampling port 20 of the fluid sampling vessel 1 is then fitted to the adapter 51 by pushing the sampling port 20 over the boss 56 of the adapter 51. When the boss 56 is fully inserted in the guide portion 24 of the conduit 21, the ball valve 40 of the fluid sampling vessel 1 is opened by the activating probe 54. Pressing the pressing surface 55 of the sampling valve 53, for example with a thumb or other finger of the hand holding the fluid sampling vessel 1, then permits the fluid at higher pressure to be drawn from the fluid source through the fluid flow channels in the sampling valve 53 and the adapter 51 and into the evacuated bottle 2 through the boss 56 and past the ball valve 40 valve in the retaining portion 25 of the conduit 21. Releasing pressure on the pressing surface 55 causes the sampling valve 53 to close thereby terminating fluid flow into the bottle 2. Removing fluid sampling vessel 1 from the activating probe 54 permits the spring 42 to urge the ball 41 back on to the valve seat 26, thereby once again sealing the conduit 21. The adapter 51 can then be removed from the sampling valve 53 by disconnecting the adapter body fitting 57 from the adapter body 52, and the sampling valve 53 can be removed from the fluid outlet by disconnecting the fluid outlet fitting 58 from the fluid outlet.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A fluid sampling vessel comprising:
   a bottle having a mouth;
   a cap for the bottle, the cap comprising
      a rim sealingly engageable with the mouth of the bottle,
      a sampling port through a top of the cap fluidly connecting an interior volume of the bottle with an external environment,
      an open-ended conduit extending from the sampling port at an underside of the cap into the bottle when the cap is engaged with the bottle so that fluid entering the sampling port from the external environment can flow from a first end of the conduit to a second end of the conduit into the bottle, the conduit comprising a guide portion proximate the first end and a valve retaining portion proximate the second end and longitudinally aligned with the guide portion, the guide portion separated from the valve retaining portion by a valve seat;
   a spring-loaded ball valve situated in the valve retaining portion, the spring-loaded ball valve comprising a ball and a spring, the ball seated on the spring and biased by the spring toward the valve seat, the ball preventing fluid from flowing between the guide portion and the valve retaining portion when the ball is seated on the valve seat and permitting fluid to flow between the guide portion and the valve retaining portion when the ball is pushed away from the valve seat against the bias of the spring; and
   a removable retainer mounted proximate the second end of the conduit, the retainer preventing the spring and the ball from exiting the conduit through the second end while permitting fluid to flow out of the conduit into the bottle.

2. The vessel of claim 1, wherein the rim is sealingly engageable with the mouth of the bottle by a sealing element, and the cap comprises a perimetrical groove around an inner circumference at an underside of the cap for retaining the sealing element in the cap.

3. The vessel of claim 2, wherein the sealing element comprises an elastomeric o-ring.

4. The vessel of claim 1, wherein the spring comprises a helical compression spring.

5. The vessel of claim 1, wherein the removable retainer comprises a tension clip washer having a perimetrical raised edge mated with an internal clip groove in the valve retaining portion of the open-ended conduit.

6. The vessel of claim 1, wherein the removable retainer comprises at least one aperture therein to permit fluid flow between the interior volume of the bottle and the valve retaining portion of the open-ended conduit.

7. The vessel of claim 5, wherein the valve retaining portion of the open-ended conduit comprises opposed slots in a wall thereof to facilitate insertion and removal of the tension clip washer from the open-ended conduit.

8. The vessel of claim 1, further comprising an analysis sensor located in the interior volume of the bottle for collecting physical and/or chemical property data on the fluid in the bottle.

9. The vessel of claim 8, wherein the analysis sensor wirelessly transmits the data collected to a receiving device outside the fluid sampling vessel.

10. A fluid sampling vessel comprising:
a bottle having a mouth;
a cap for the bottle, the cap comprising
a rim sealingly engageable with the mouth of the bottle,
a sampling port through a top of the cap fluidly connecting an interior volume of the bottle with an external environment,
an open-ended conduit extending from the sampling port at an underside of the cap into the bottle when the cap is engaged with the bottle so that fluid entering the sampling port from the external environment can flow from a first end of the conduit to a second end of the conduit into the bottle, the conduit comprising a guide portion proximate the first end and a valve retaining portion proximate the second end and longitudinally aligned with the guide portion, the guide portion separated from the valve retaining portion by a valve seat;
a spring-loaded ball valve situated in the valve retaining portion, the spring-loaded ball valve comprising a ball and a helical compression spring, the ball seated on the spring and biased by the spring toward the valve seat, the ball preventing fluid from flowing between the guide portion and the valve retaining portion when the ball is seated on the valve seat and permitting fluid to flow between the guide portion and the valve retaining portion when the ball is pushed away from the valve seat against the bias of the spring; and
a removable retainer mounted proximate the second end of the conduit, the retainer preventing the spring and the ball from exiting the conduit through the second end while permitting fluid to flow out of the conduit into the bottle, the retainer comprising a tension clip washer having a perimetrical raised edge mated with an internal clip groove in the valve retaining portion of the open-ended conduit, the retainer comprising at least one aperture therein to permit fluid flow between the interior volume of the bottle and the valve retaining portion of the open-ended conduit, the valve retaining portion of the open-ended conduit comprising opposed slots in a wall thereof to facilitate insertion and removal of the tension clip washer from the open-ended conduit.

11. A fluid sampling system comprising:
the fluid sampling vessel as defined in claim 1; and,
an adapter releasably connectable to the sampling port of the cap of the vessel and to a fluid outlet of a source of the fluid, the adapter comprising
a fluid flow channel in fluid communication with the open-ended conduit of the vessel and the source of the fluid when the adapter is connected to both the sampling port and the fluid outlet, and
an activating probe for opening the spring-loaded ball valve when the adapter is connected to the sampling port.

12. The system of claim 11, wherein the activating probe comprises an engagement surface that engages the ball of the spring-loaded ball valve to displace the ball against the bias of the spring to open the spring-loaded ball valve when the activating probe is connected to the sampling port of the cap of the vessel.

13. The system of claim 11, further comprising an actuatable sampling valve connectable to the adapter and the fluid outlet between the adapter and the fluid outlet, the actuatable sampling valve openable to permit fluid flow from the fluid outlet to the adapter and closeable to prevent fluid flow from the fluid outlet to the adapter.

14. The system of claim 11, further comprising a vacuum line connector releasably connectable to the sampling port of the cap of the vessel and to a vacuum line, the vacuum line connector comprising
a fluid flow pipe in fluid communication with the open-ended conduit of the vessel and the vacuum line when the vacuum line connector is connected to both the sampling port and the vacuum line, and
a valve opener for opening the spring-loaded ball valve when the vacuum line connector is connected to the sampling port.

15. The system of claim 14, wherein the valve opener comprises an engagement surface that engages the ball of the spring-loaded ball valve to displace the ball against the bias of the spring to open the spring-loaded ball valve when the vacuum line connector is connected to the sampling port of the cap of the vessel.

* * * * *